United States Patent [19]
Griffiths et al.

[11] 3,708,138
[45] Jan. 2, 1973

[54] AIRCRAFT SHAPED TOW TARGET

[75] Inventors: William R. Griffiths, Costa Mesa; Donald E. Johnston, Garden Grove; John S. Yates, Placentia; Gerard E. Layer, Corona Del Mar, all of Calif.

[73] Assignee: The Susquehanna Corporation, Fairfax County, Va.

[22] Filed: Dec. 14, 1970

[21] Appl. No.: 97,684

[52] U.S. Cl..................................................244/16
[51] Int. Cl............................................B64c 31/00
[58] Field of Search..........244/154, 16, 108, 109, 49; 273/105.3, 105.4; 46/78, 77, 79, 80, 81

[56] References Cited

UNITED STATES PATENTS

| | | | |
|---|---|---|---|
| 2,969,946 | 1/1961 | Andrews | 244/154 |
| 2,821,396 | 1/1958 | Seeley | 273/105.4 |
| 3,030,111 | 4/1962 | Hendershott | 273/105.4 |
| 582,757 | 5/1897 | Mouillard | 244/16 |
| 3,222,816 | 12/1965 | Effinger et al. | 46/78 |
| 1,745,808 | 2/1930 | Querry | 244/108 X |
| 2,407,777 | 9/1946 | Grawunder | 244/16 |
| 924,833 | 6/1909 | Rogers | 244/16 |

FOREIGN PATENTS OR APPLICATIONS 591,936   2/1960   Canada ..................................46/78

*Primary Examiner*—Milton Buchler
*Assistant Examiner*—Jesus D. Sotelo
*Attorney*—Tipton D. Jennings

[57] ABSTRACT

An aircraft shaped tow target capable of being towed by jet aircraft at high speeds is disclosed. The airframe of the target includes two wings and a vertical fin and is fabricated from a lightweight structural material such as foamed plastic. A support tube is installed at the leading edge of each wing and the vertical fin. The wing structure includes a wing channel which extends the length of the wing and which is foamed into the wing panel during fabrication. A hinged member allows the two wing channels to be joined to form a third channel into which the vertical fin is installed. Towing and control of the target is effected by a lightweight tow bridle connecting the target and tow aircraft. The landing assembly includes a skid configuration which allows target takeoff and landing to be accomplished on a normal paved runway.

10 Claims, 8 Drawing Figures

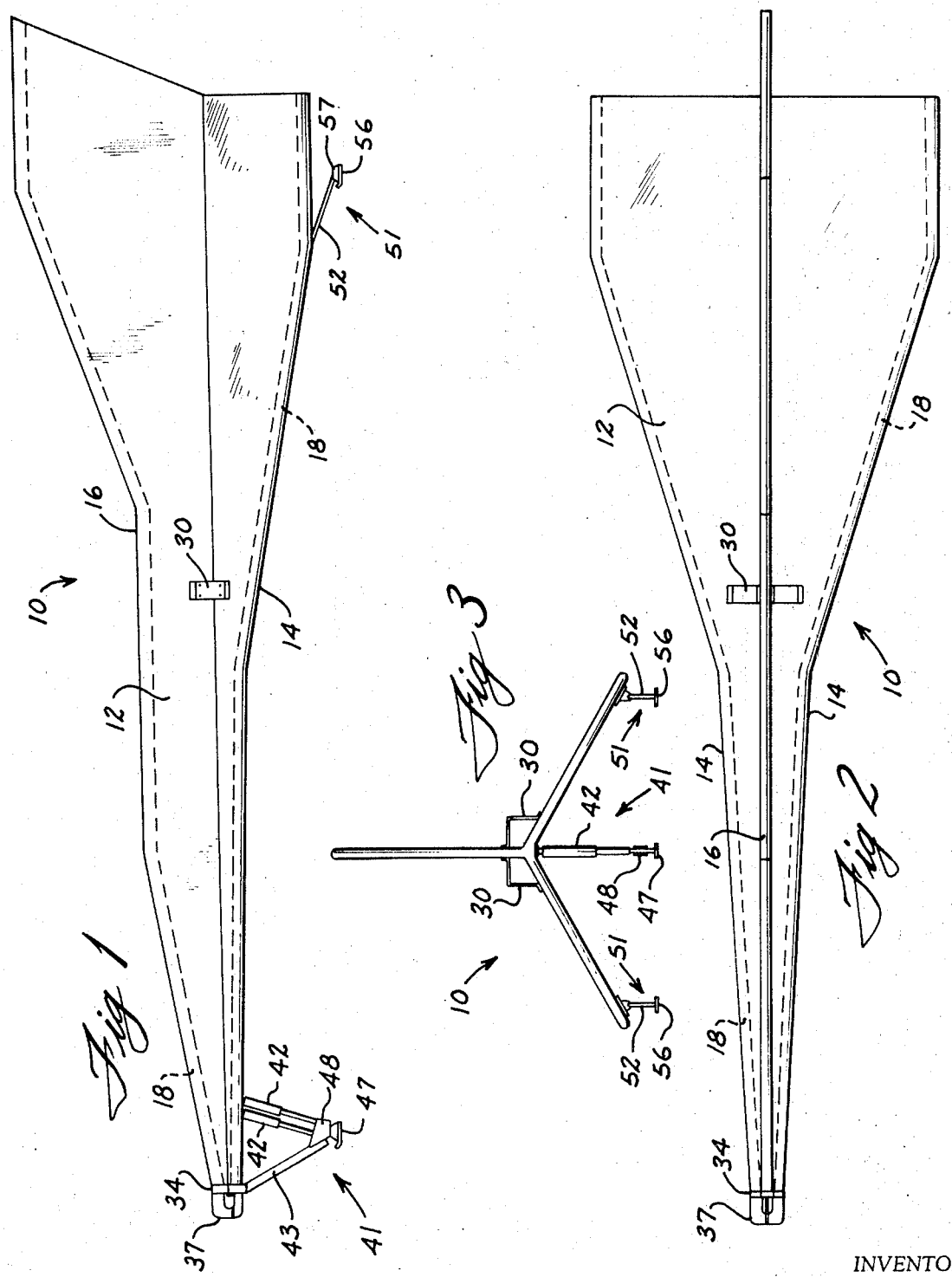

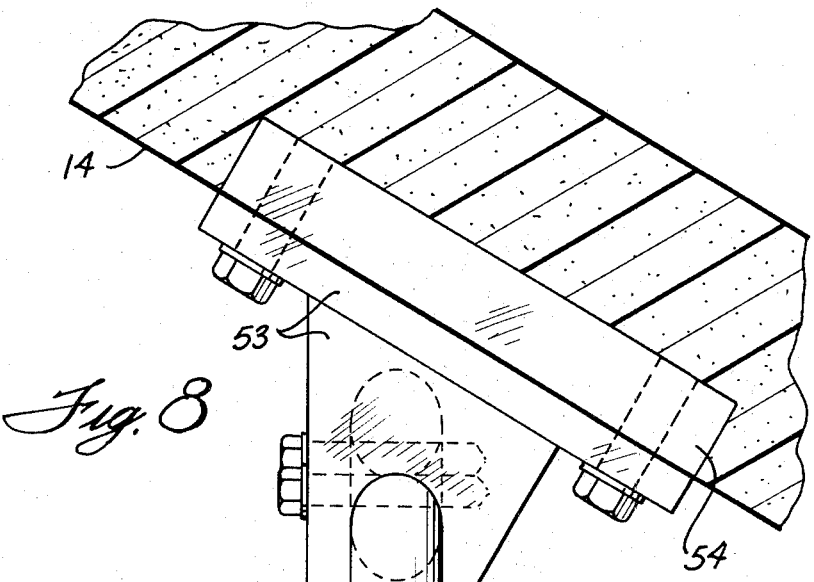
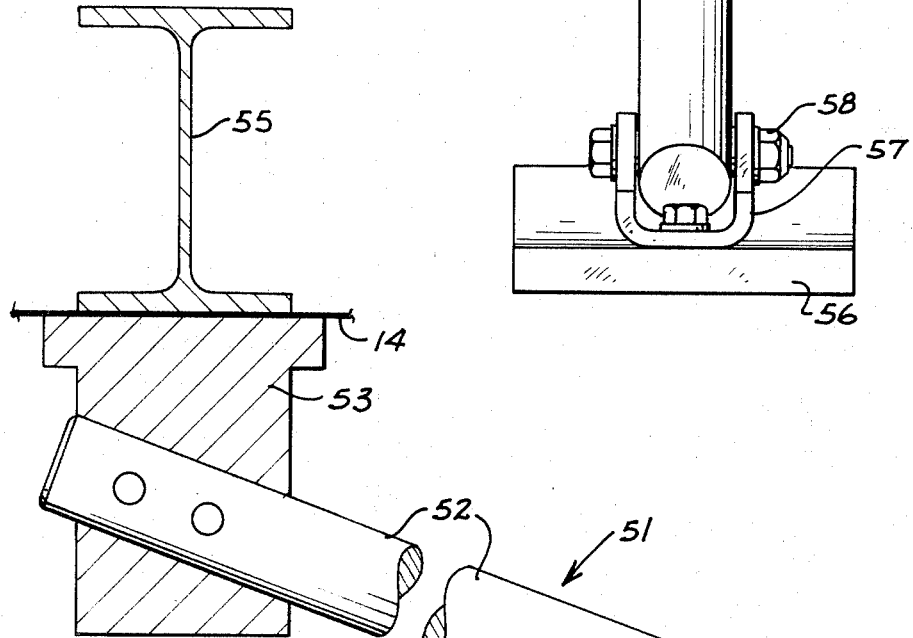

3,708,138

AIRCRAFT SHAPED TOW TARGET

BACKGROUND AND SUMMARY OF THE INVENTION

This invention relates generally to a tow target and, more particularly, to a lightweight recoverable aircraft shaped tow target capable of being towed at high speeds by jet aircraft.

Heretofore, many types of aerial tow targets have been employed in conjunction with tow aircraft. Many of the tow targets which have been designed to be towed by aircraft have not been designed for the high speeds which are encountered when the towing aircraft is a jet aircraft. Such aircraft have also been of somewhat flimsy construction and therefore have not been capable of withstanding repeated launchings and recoveries. In addition, such prior art aircraft have not been capable of sustaining gun fire hits without complete loss of the tow target.

By the present invention there is provided a lightweight recoverable aircraft shaped tow target capable of being towed at high speeds by jet aircraft. The present target is capable of repeated launchings and recoveries. The airframe of the present tow target is capable of sustaining direct gun fire hits without adverse degradation to the structural integrity of the airframe. Target takeoff and landing can be accomplished on a normal paved runway. The construction of the present target lends itself to easy assembly and disassembly as well as providing a structure which is easy to repair.

The tow target of the present invention has an airframe which includes two wings and a vertical fin. The airframe can be fabricated from a lightweight structural material such as foamed plastic. A support tube is installed to serve as the leading edge of each wing and the vertical fin. The body is preferably covered with a high-strength coating material. The wing structure of the present tow target includes a wing channel configuration which is foamed into each wing during fabrication. Towing and control of the target is effected by a lightweight tow bridle connecting the target and the tow aircraft. The landing assembly includes a skid configuration which is so constructed that target takeoff and landing can be accomplished on a normal paved runway. The wing channel, one of which is installed in each wing structure and extends the length of the wing, allows the two wings to be joined together by a common hinge that is attached to each wing channel. When the wings are in their flight position, the wing channels of each wing together form a third channel into which the vertical fin can be installed. The installation of the vertical fin thus provides a positive lock for the structural joint with the wings. The wings may be folded by means of the common hinge to provide a compact folded package for ease in transportation.

Referring to the drawings:

FIG. 1 is a side elevational view of a fully assembled tow target constructed in accordance with the principles of the present invention;

FIG. 2 is a plan view of the tow target shown in FIG. 1;

FIG. 3 is an end view of the rear portion of the tow target shown in FIG. 1;

FIG. 7 is an enlarged side elevational view, partly in section, of the rear landing assembly of the tow target shown in FIG. 1; and FIG. 8 is an enlarged end view, partly in section, of the rear landing assembly shown in FIG. 7, showing an alternative mounting bracket.

DESCRIPTION OF THE PREFERRED EMBODIMENT

Figure 4:
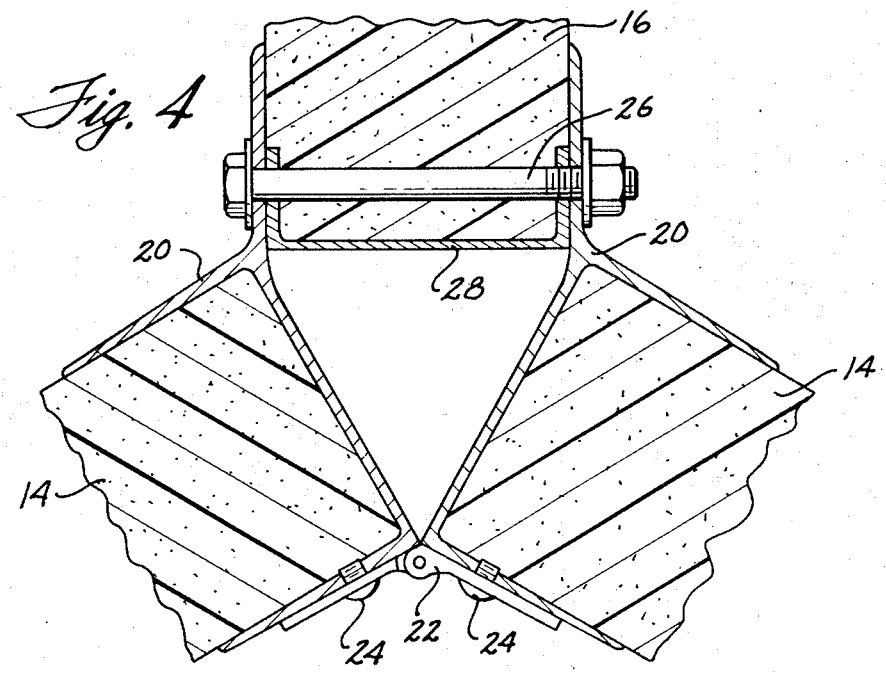
FIG. 4 is an enlarged sectional view of the structural joint of the wings and vertical fin of the tow target shown in FIG. 1.

In the illustrated embodiment of the present invention as shown in FIGS. 1, 2 and 3, a tow target 10 is provided having a body 12 formed of a lightweight structural material, such as a foamed plastic, preferably rigid polyurethane foam, or other suitable material. The body 12 includes two wings 14 and a vertical fin 16. A support tube 18 formed of a lightweight rigid material having relatively high structural strength, such as aluminum or another suitable material, is foamed into the body 12 and serves as the leading edge of the wings 14 and fin 16 about which the lightweight material is molded. The surface of the tow target 10 may be covered with a lightweight high-strength coating material such as fiberglass. The structural features of the fin and wings are identical, including the support tube 18 that serves as the leading edge, the foamed-in-place inner structure of the lightweight structural material, and the exterior coating of fiberglass or other suitable material. As an example of a foamed plastic which can be employed, rigid polyurethane foam having a density of about two pounds per cubic foot has been used with good results. Installed within each wing structure is a lightweight wing channel 20, shown in FIG. 4, of aluminum or other similar material, which is foamed into the wing panel during fabrication. This wing channel 20, which is bonded to the base of each wing, serves as a means of joining the two wing structures 14 and the vertical fin 16. The two wings 14 are joined by a common hinge 22, of aluminum or a similar material, that is attached to each wing channel 20 by means of bolts 24 or similar means. The wing channels 20 are so constructed as to form a third channel when the wings are installed in their flight position, which can be, for example, at an angle of 120° with respect to each other. This third channel is formed by an extension on each of the two wing channels 20 which provides a means for installation of the vertical fin 16, which can be inserted within the extensions of wing channels 20 and secured by means such as a bolt 26. The vertical fin 16 has molded into its lower edge a U-shaped channel 28, formed of aluminum or a similar material. The installation of the vertical fin 16 within the channel formed by the wing channels 20 provides a positive lock for the structural joint between the two wings 14 and the fin 16. This channel configuration with the two wings being joined by a common hinge also permits the target to be transported in a compact, folded position.

As shown in FIGS. 1, 2 and 3, a tow bracket 30, fabricated from aluminum or similar material, provides the means for attaching the tow bridle from the towing aircraft for towing and controlling the target 10 during flight. The tow bracket 30 can be secured directly to the wings 14 and the vertical fin 16 by bolts or similar means. The tow bridle (not shown) is preferably attached at the outer portion of the tow bracket 30 on each side of the vertical fin 16, as it has been found that positive target control during flight is most readily obtained by spacing the bridle attachments some distance apart.

The forward portion of the tow target as shown in FIGS. 1, 2 and 3 includes a ballast plate assembly 34 and a nose assembly 37. The ballast plate assembly 34 is attached at the forward portion of the tow target at the point where the wings 14 and vertical fin 16 are joined. The ballast plate assembly 34 includes a heavy plate of steel or similar material, to provide ballast to the forward portion of the tow target. The ballast plate is preferably cut to a tri-fin cross-section to match the cross-section of the forward portion of the target body 12 to which it is attached. The ballast plate 34 may be secured to the body 12 of the target by any suitable means as longitudinal strips which are formed to fit the leading edge of the wings 14 and vertical fin 16 and attached by suitable bolt means. The ballast plate assembly 34 preferably includes a threaded rod or similar means for attachment of the nose assembly 37 and also as a means of attaching additional thicknesses of ballast material for use in adjusting the flight characteristics of the target. The nose assembly 37 provides an aerodynamic shape for the forward end of the airframe and also provides additional ballast for the tow target. The nose assembly may be fabricated from aluminum or steel or a similar material, depending upon the amount of ballast weight which is desired.

Figure 5:
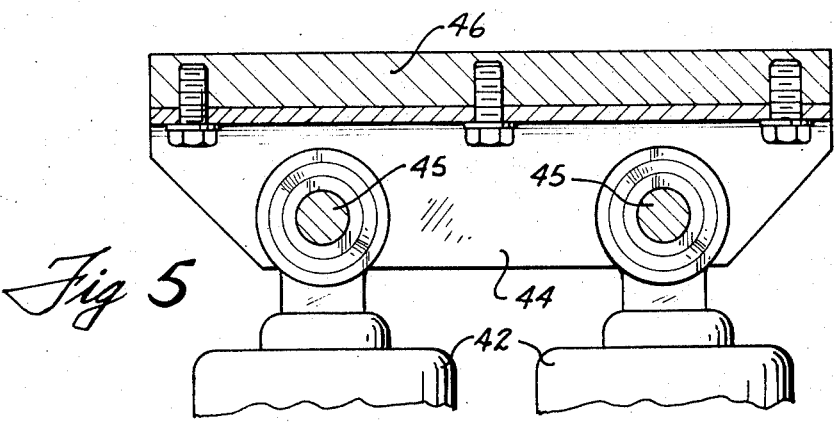
FIG. 5 is an enlarged side elevational view, partly in section, of the forward landing assembly of the tow target shown in FIG. 1.
Figure 6:
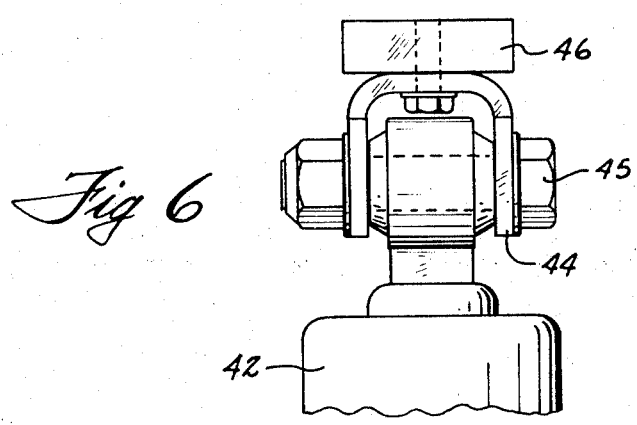
FIG. 6 is en enlarged end view, partly in inspection of the forward landing assembly shown in FIG. 5.

As shown in FIGS. 1 and 3, a forward landing assembly 41 and two rear landing assemblies 51 are provided, the forward landing assembly 41 being attached near the nose end of the target 10 and a rear landing assembly 51 being attached to each wing tip near the aft end of the target. The forward landing assembly 41 includes two shock-absorbing means 42, preferably mounted in tandem and a support arm 43. The support arm 43 is attached at the ballast plate assembly 34 by suitable means while the two shock-absorbing arms 42 are attached to the body by means of a bracket 44, as shown more clearly in FIGS. 5 and 6. The shock-absorber arms 42 can be any suitable conventional shock absorbers, such as, for example, conventional shock absorbers employed in the automobile industry. The bracket 44 to which the shock absorber arms 42 are attached by suitable means such as bolts 45 can be secured to a plate 46 which is connected to the lower portion of the target body 12. Preferably, the contact point for the landing assembly with the ground is in the form of a skid configuration. The skid shoe 47, fabricated from heat-treated steel or a similar material, includes a mechanical stop (not shown) built into the attachment bracket 48 for the shoe 47 which prevents the shoe from rotating counterclockwise about its point of attachment with the bracket 48 and thus maintains the shoe 47 in a horizontal plane relative to the ground which is particularly important during the landing approach of the target.

The rear landing assembly 51 is also preferably in the form of a skid configuration and is of a cantilevered beam design which utilizes a solid bar 52 manufactured of steel or similar material for energy absorption. As shown in FIGS. 7 and 8, the rear assembly 51 includes a mount 53, fabricated from lightweight aluminum or similar material, to provide the means for attaching the rear landing assembly 51 to each wing tip 14. As shown in FIGS. 7, the mount 53 may be attached to the wing 14 by suitable bolt or similar means to a channel 55 foamed into the wing 14 during manufacture. An alternative mount is shown in FIG. 8 in which bracket 53 is secured by bolt or similar means to a plate 54 which has been foamed into the wing 14. The bracket, channel and plate may be manufactured of aluminum or a similar material. The solid bar 52 can be fabricated from round bar stock, for example, to provide means for damping the dynamic forces which are encountered during landing and takeoff. Rear skid shoe 56, which is of similar design to the forward skid show 47, is secured to attachment bracket 57 by bolt or similar means 59 which in turn is attached to the bar 52 by means such as a bolt 58. The rear skid shoe 56 is provided with a mechanical stop (not shown) which is mounted on the attachment bracket 57 and which prevents the shoe 56 from rotating in a counterclockwise direction, thus providing proper alignment of the shoe 56 with respect to the landing runway during the landing approach of the tow target 10. The skid assemblies 41 and 51 provide means for transversing the tow target 10 over hard surfaces such as concrete during takeoff and landing with means included for absorbing the forces which would otherwise be transmitted to the target body 10. In addition, the skid assemblies provide the necessary frictional resistance for slowing and stopping the target after landing. The landing assemblies of the present tow target are preferably constructed to provide a built-in 1° nose-down attitude of the target during landing in order to reduce the possibility of nose-up reactions or rebound during target landing. This nose-down attitude also aids in distributing the aerodynamic forces imposed upon the airframe during the takeoff sequence of flight. Wheels may be removably secured to the underside of the skids when the target is on the ground for ease in transporting the target from one location on the airfield to another.

The tow target of the present invention is designed to be towed by jet aircraft at speeds in excess of 450 knots and to be subjected to structural loads in excess of six times the force of gravity. The present target provides a realistic, up-to-date target profile for in-flight target practice. Various electronic instruments can be easily attached to provide changes in target presentation or for monitoring purposes. The present target is also adapted for the installation of any of various scoring devices used in scoring the accuracy of attacks made on the target.

It is thought that the invention and many of its attendant advantages will be understood from the foregoing description, and it will be apparent that various changes may be made in the instant construction without departing from the spirit and scope of the invention or sacrificing all of its material advantages, the form hereinbefore described being merely a preferred embodiment thereof.

It is claimed:

1. An aircraft shaped tow target capable of being towed at high speeds by jet aircraft to simulate the flight of an actual target aircraft comprising:

a. two wing members
b. a vertical fin member, each wing member and the vertical fin member including a support tube installed at the leading edge thereof,
c. a channel member installed in each wing member and extending longitudinally through substantially the entire length of each wing member,
d. a hinge member joining the wing members adjacent the channel members, the channel members being constructed so as to form an additional channel when the wing members are joined, in which additional channel the vertical fin member is installable in locking engagement with the wing members.

2. The tow target of claim 1 in which each channel member is formed of a lightweight metallic material and is molded in place within each wing member.

3. The tow target of claim 1 in which the support tube is formed of a lightweight metallic material and is molded in place within said wing member and fin member.

4. The tow target of claim 1 further including skid means for contact of the tow target with the ground during takeoff and landing, said skid means comprising a forward landing skid assembly attached at the forward portion of the tow target and two rear landing skid assemblies, one of said rear landing skid assemblies being attached to the after portion of each wing member.

5. An aircraft shaped tow target capable of being towed at high speeds to simulate the flight of an actual target aircraft comprising:
a. a foldable wing structure comprising:
  1. two wing members, each having a leading edge and a base,
  2. a wing channel connected to the base of each wing member, each wing channel extending longitudinally through at least a major portion of the length of each wing member,
  3. a hinge connected to both wing channels to permit the wing structure to be folded for transport and to be unfolded for assembling the tow target,
  4. an extension on each wing channel, said extensions defining a vertically disposed third channel,
b. a vertical fin member positioned in said third channel and having a leading edge and a base, and
c. means for securing said vertical fin member at the base thereof in said third channel.

6. The tow target of claim 5 further comprising a tube connected to the leading edge of each of said wing members and said vertical fin member to provide structural support for each of said members.

7. The tow target of claim 6 wherein each of said channel members is formed of a lightweight metallic material which is molded in place within a respective one of each of said wing members.

8. The tow target of claim 7 wherein each of said tubes is formed of a lightweight metallic material which is molded in place at the leading edge of a respective one of said wing and fin members.

9. The tow target of claim 8 wherein all of said wing and fin member are constructed primarily of a rigid foamed plastic coated with a lightweight high-strength material.

10. The tow target of claim 9 further comprising means connected to each of said wing members and fin member for making contact with the ground during takeoff and landing.

* * * * *